J. HARVEY.
COMBINED HARROW AND ROLLER.
No. 255,978. Patented Apr. 4, 1882.
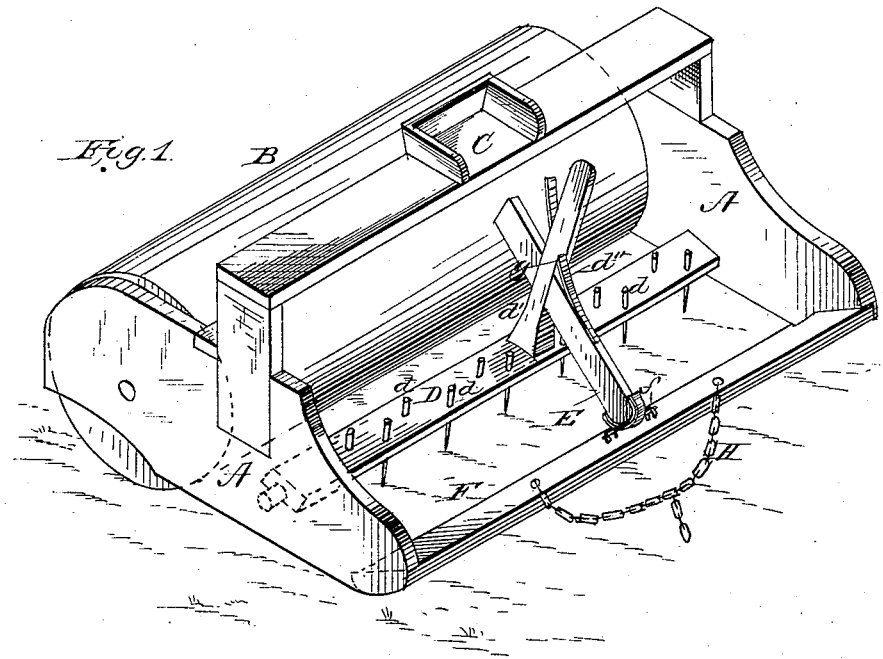
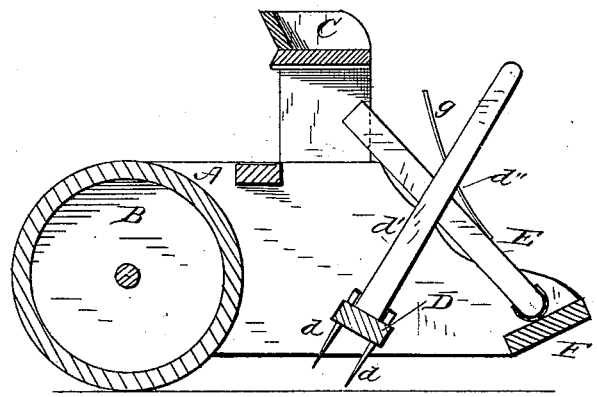
WITNESSES
P. L. Durand
George Cornell
INVENTOR
John Harvey
by L. Deane
his Attorney

UNITED STATES PATENT OFFICE.

JEHU HARVEY, OF WOODY'S CORNER, INDIANA.

COMBINED HARROW AND ROLLER.

SPECIFICATION forming part of Letters Patent No. 255,978, dated April 4, 1882.

Application filed August 6, 1879.

*To all whom it may concern:*

Be it known that I, JEHU HARVEY, of Woody's Corner, in the county of Parke and State of Indiana, have invented certain new and useful Improvements in Combined Harrows and Rollers, of which the following is a specification.

In the drawings, Figure 1 shows the present device in perspective; Fig. 2, in section on line $x\ x$ of Fig. 1.

This invention relates to certain improvements in cultivators of that class in which an adjustable harrow is combined with a land-roller.

Such machines as heretofore made are complicated in construction and very expensive; and the object of the present invention is to produce a cultivator which will be extremely simple in construction, and which can be supplied at such a cost as to bring it within the means of all classes of farmers. I attain these objects by the mechanism illustrated in the accompanying drawings, in which—

The letter A denotes the frame, in the rear part of which is mounted the roller B, so that it may have free motion on its axle. At about the center of the frame, and on its upper part, is the driver's seat C. Beneath this, and in the lower part of the frame A, the bar D, carrying the harrow-teeth $d$, is pivoted parallel with the roller. By means of its handle or arm $d'$, which projects forward from about the center part of the harrow-bar D, the harrow can be tilted at will by the driver, so as to come horizontally on the face of the ground, when the teeth $d$ will take into the soil; or it can be inclined toward the ground, so that its teeth will only take slightly into the soil; or it may be so turned as to prevent it coming at all in contact with the soil. This handle or arm $d'$ has a mortise or socket, $d''$, about midway of its length, through which passes the guide and stay bar E. Said bar is hinged at its lower end, $f$, to the foot-board F, placed at the lower front part of the frame. The said bar F is placed at such an angle to the frame A that while it serves effectively as a clod-crusher it also forms a substantial base for the bar E and presents said bar at the most effective angle to the arm $d'$. This bar E has teeth or notches $e$ on its under side, which are designed to engage on the edge of socket or mortise $d''$, and thus hold the arm $d'$ fixed in any desired position. Thus the harrow can be set at any angle or in any position desired.

To the guide or stay bar E, on the side opposite the notches, is attached the spring $g$, which, acting against the walls of the socket or mortise $d''$, serves to brace the bar against the opposite side of said socket and insure the engagement of the teeth or notches $e$ with said socket, as above described. Draft can be applied to the chain H, or in any usual way.

As thus made the device is very well balanced for use. The roller is situated in the best position for effective action, and the harrow is placed in the very strongest part of the frame, and in such position as to feel most the weight of the frame as well as of the driver, and the means for tilting the harrow are so adapted that by a single lever the operating force will be easily and equally applied to the entire length of the harrow-bar.

I am aware that heretofore have been combined in a single device harrows and rollers, and do not broadly claim such combination as my invention; but such have been complicated in their construction and arrangement, and consequently too expensive for general use.

Having thus described my invention, what I consider new, and desire to secure by Letters Patent, is—

The harrow-frame A, provided with roller B and seat C, and having the rocking bar D, in which are set the teeth $d$, and the centrally-fixed and upwardly-projecting arm $d'$, slotted at $d''$, combined with the spring $g$, hinged and notched stay-arm E, and crusher-board F, substantially as set forth.

In testimony that I claim the foregoing as my own I affix my signature in presence of two witnesses.

JEHU HARVEY.

Witnesses:
JOHN B. DOWD,
ORAN HUNNICUTT.